United States Patent [19]

Gold

[11] Patent Number: 4,841,698
[45] Date of Patent: Jun. 27, 1989

[54] AUTOMOTIVE WINDOW RETENTION SYSTEM AND RETENTION ELEMENT THEREFOR

[76] Inventor: Peter Gold, 465 N. Wood Rd., Rockville Centre, N.Y. 11570

[21] Appl. No.: 206,823

[22] Filed: Jun. 15, 1988

[51] Int. Cl.$^4$ .............................................. E06B 3/00
[52] U.S. Cl. ........................................ 52/208; 52/397
[58] Field of Search .................. 52/397, 400, 401, 208, 52/127.3, 127.2, 511, 171, 202, 203

[56] References Cited

U.S. PATENT DOCUMENTS

| | | | |
|---|---|---|---|
| 1,681,443 | 8/1928 | Steinman | 52/203 |
| 1,694,677 | 12/1928 | Will | 52/203 |
| 1,783,861 | 12/1930 | Thiem | 52/203 |
| 4,712,341 | 12/1987 | Harris, Jr. et al. | 52/208 |

*Primary Examiner*—David A. Scherbel
*Assistant Examiner*—Michele A. Van Patten
*Attorney, Agent, or Firm*—Collard, Roe & Galgano

[57] ABSTRACT

An automotive window assembly of the type having a stationary window assembly insertable onto a peripheral flange of a rabbet flanged window aperture which is formed in an automotive vehicle body. The window assembly is designed to be adhesively secured to the automobile body after being mounted on the peripheral flange. The window assembly includes a plurality of cup-shaped retention elements which have inner sides fixedly secured to the inner peripheral surface of the window assembly. Each retention element has a resilient outer side, and a generally perpendicular, outwardly extending stem joined at one end thereof to the resilient outer side of each of the plurality of retention elements. The stem is inwardly deflectable about the joint formed at the one end thereof and the resilient outer side of the cup-shaped retention element. The stem includes a plurality of teeth for engaging the peripheral flange of the window aperture, thereby retaining the window assembly on the motor vehicle upon the application and curing of the adhesive.

7 Claims, 1 Drawing Sheet

AUTOMOTIVE WINDOW RETENTION SYSTEM AND RETENTION ELEMENT THEREFOR

BACKGROUND OF THE INVENTION

1. Field of the Invention

This invention relates to an automotive window assembly retention system for motor vehicle windows which are fixed (i.e. stationary) with respect to the vehicle body. Specifically the invention relates to a resilient retention element capable of being bonded to a window and adapted to engage the periphery of a rabbet frame flange around the window aperture within the vehicle body to facilitate assembly of the window thereto.

2. Description of the Prior Art

It is well known to attach a rubber or polyvinyl chloride (PVC) base to a glass or plastic window assembly either by using adhesives or by molding the base onto the window assembly. The base includes retention elements formed thereon that engage the rabbet flange on the vehicle body and hold the window to the body. Normally the retention elements are all resiliently engaged in the periphery of the window rabbet frame, which resiliency is a function of the retention element material, the base material and the type of interconnection formed between the retention element and the base.

Many non-movable windows used in modern automobiles utilize a modular window design in which a flexible base material is molded in place about the periphery of the window. These so-called modular window assemblies have been found desirable by automotive designers and manufacturers since they readily permit positioning of the outer surface of the window glass close to the outer surface of the automobile body to give a flush appearance and enhance the vehicle aerodynamics. These modular window assemblies are placed, during the assembly of the vehicle, in apertures in the vehicle body formed as body panel rabbet flanges.

The insertion of the modular window assemblies takes place in a moving assembly line prior to the final curing of adhesive which secures the modular window assembly to that portion of the vehicle body. Since the realities of manufacturing recognize the variation in peripheral fits between the modular window assembly and the body aperture into which the window assembly is inserted, it s necessary to fix the position of the modular window assembly with respect to the body as it moves along the line toward the position in which it is finally adhesively secured. Such handling is also necessary in assembly operations in which the body is stopped for robotic assembly of windows.

In the automobile industry, many clip mechanisms have been utilized to perform this function, particularly in plain fixed or stationary glass assemblies as opposed to modular window assemblies. Exemplary of such cips are those shown in U.S. Pat. Nos. 4,235,056 to Griffin and 4,161,851 to Inamoto et al. Similar clip mechanisms were fixed to the molded outer edge of modular window assemblies to perform the desired function. Such clips included mechanisms in which a leg extended perpendicularly from the glass surface and terminated in a backwardly extending free arm to angularly engage the periphery of the rabbet flange. The use of such clips has not been found to be desirable in that they tend to not positively lock the window in position, as is desired, in a reliable manner.

Another retaining system is disclosed in U.S. Pat. No. 4,712,341 which was issued on Dec. 15, 1987 to Charles F. Harris, Jr. and James C. Coleman. This patent describes a modular window assembly clip for positioning an automotive modular window within the body aperture on which the window rabbet frame is formed. The assembly includes a PVC base bonded to the window and a locking leg portion extending away from the window base toward the interior of the vehicle. The locking leg portion is arranged angularly with respect to the positioning leg portion and terminates in a curvilinear locking surface which, as shown, includes teeth for cam-like locking engagement with the periphery of the flanged body aperture. U.S. Pat. No. 4,700,525, which issued on Oct. 20, 1987 to Nieboer et al, also discloses a molded window panel assembly utilizing a clip-like fastener for attaching the window panel to the aperture or recess in the vehicle body.

When a clip of the type disclosed in U.S. Pat. No. 4,712,341 is formed on the PVC base bonded to the glass panel and is engaged with the flange on the aperture of the vehicle, it resiliently deflects with the teeth portion engaging the periphery of the flange on the vehicle frame. This deflection causes stresses to develop which are highest at the point of connection between the retainer leg and the PVC base. It has been found that in some cases stresses are developed upon initial installation which are sufficient to cause a failure, i e., the leg breaking off at the base. In addition, because of the resiliency of the retainer, after the retainer has been deflected, it does not maintain its retention strength. This is because it is not made of perfectly elastic material and therefore yields during installation so that the retention of the window panel prior to installation of the adhesive or sealant is not maintained in proper alignment with the window aperture.

The problems at initial installation discussed above are aggravated by variations in the periphery of the flange on the vehicle structure, which variations are always present during manufacturing. Thus, when the retainer is engaged with the window frame in the vehicle, it is not unusual for the retention element stem to disengage upon initial installation or to break off during the installation process because of the variations in window aperture sizes. This adds to the difficulty in preventing leakage of the adhesive that is applied on the inside of the window aperture, normally under pressure, around the flange in the aperture and to the front of the window assembly. This adhesive permanently retains the glass in the window aperture after curing, and, if the retainer is released or fails during the curing stage of manufacture, it may actually result in leakage around the window.

The retention system of the present invention overcomes these problems by providing a flexible retention element which can be applied directly to the window panel glass so that the peripheral molding of the prior art may be eliminated. The flexible nature of the retention element allows for greater deflection of the stem thereon without the possibility of breaking during insertion, and even allows the stem to be realigned from the inside of the vehicle after insertion of the window panel assembly.

SUMMARY OF THE INVENTION

It is an object of the invention to provide a system for mounting stationary motor vehicle window assemblies onto a flange within a window aperture formed in a motor vehicle body.

It is a further object of the invention to provide a window assembly mounting system for motor vehicle window assemblies which can be used during assembly of the vehicle to retain the window in tight contact with the vehicle body while a pressurized adhesive is applied.

It is yet another object of the invention to provide a window retention element on the window assembly which element provides both flexible and elastic engagement while producing enough force to retain the window on the vehicle body to initially support the entire window assembly, and which retaining element is simple to manufacture and easy to install on the window assembly.

Accordingly, these objects are achieved by a window mounting system for mounting a stationary window assembly on a peripheral flange of a rabbet flanged window aperture formed in an automotive vehicle body, which window assembly is to be adhesively secured thereto. The assembly includes a plurality of retention elements having a base portion in the form of a suction cup. Each cup-shaped base portion has inner sides fixedly secured to an inner peripheral surface of the window assembly and each base portion has a resilient outer side. Each retention element has a generally perpendicular, outwardly extending stem joined at a first end thereof to the resilient outer side of each base portion. The stem is deflectable inwardly towards the window aperture about a joint formed at the one end thereof and the resilient outer side of the base.

The stem also includes a tapered portion at a second free end thereof adapted to engage the peripheral flange of the window aperture and upon engagement therewith, causes the deflection about the joint formed on the other end of the stem and the outer side of the base portion, towards the interior of the window opening. The stem, which may be made of resilient material, is provided with teeth to resiliently engage the peripheral flange for locking engagement therewith. The locking engagement occurs when the second free end of the stem is deflected inwardly toward the interior of the window opening upon insertion of the window assembly into the aperture during mounting thereof, thereby allowing the teeth to engage the edge of the peripheral flange.

These and other objects and advantages of the present invention will become apparent from the following description of the accompanying drawing, which discloses one embodiment of the present invention. It is to be understood that the drawing is to be used for the purpose of illustration only and not as a definition of the invention.

BRIEF DESCRIPTION OF THE DRAWING

In the drawing, where similar reference numerals denote similar elements throughout the several views.

DESCRIPTION OF THE PREFERRED EMBODIMENT

Figure 1:
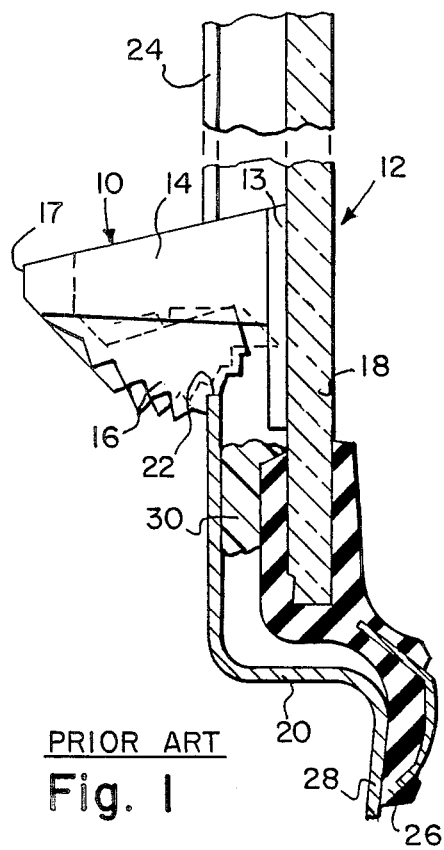
FIG. 1 is a side cross sectional view of the window retention system of the prior art.

Referring to FIG. 1, there is shown the prior art clip 10 of the prior art modular window assembly 12. Prior art clip 10 comprises a base portion 13, an upstanding positioning leg portion 14 and a locking leg portion 16 which depends in angled cantilever fashion from the upper end 17 of positioning leg 14. Clip 10 is fixed to glass 18 of modular window assembly 12. Modular window assembly 12 is positioned to be inserted into a depression of rabbet flange 20 of a motor vehicle body. An inner peripheral surface or edge 22 of flange 20 surrounds an aperture 24 of the modular window assembly 12.

Upon insertion of the modular window assembly 12 into the depression 20, contact is made between edge 22 and the outer surfaces of locking legs 16 as the window assembly is inserted into its fully bottomed position. A sealing portion, such as resilient flanged area 26, contacts a surface such as 28 of the vehicle body. While only one clip 10 is shown in FIG. 1 with its interaction with portions of the vehicle body, it is understood that a plurality of clips are arranged around the periphery of a modular window assembly. When clip 10 is locked in position as shown in FIG. 1, window assembly 12 is fixed in location with respect to flange 20 and an adhesive or sealant, such as indicated at 30, (shown cured) can be introduced and allowed to cure and harden as the vehicle moves along an assembly line.

Figure 2:
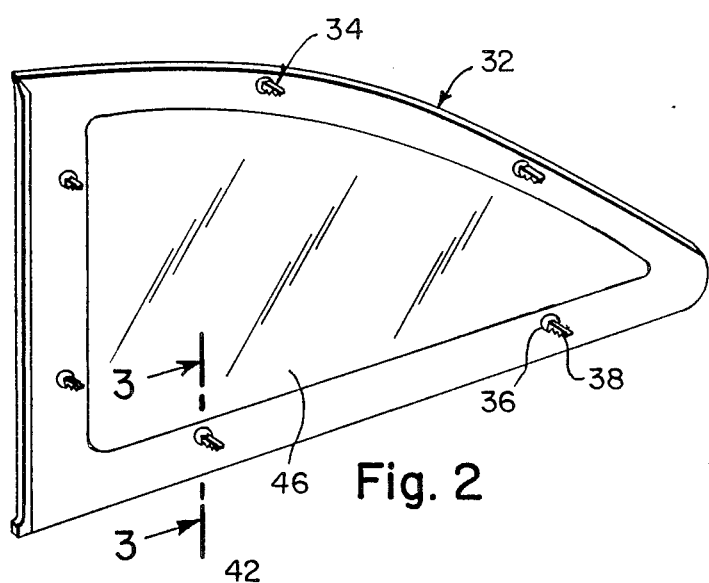
FIG. 2 is a perspective view of the interior side of the window assembly of the present invention.
Figure 3:
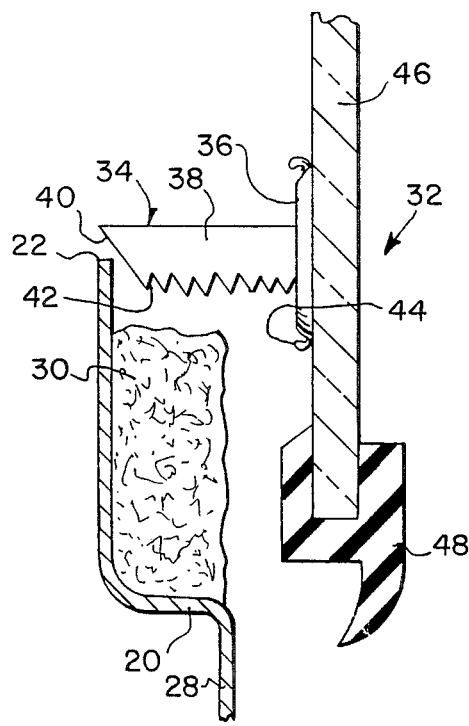
FIG. 3 is a side sectional view of the window assembly shown in FIG. 2 along the lines of 3—3 prior to insertion onto the body panel.

Turning now to FIGS. 2 and 3, there is shown a modular window assembly of the present invention, generally denoted as 32. As in the prior art device, window assembly 32 includes a plurality of retention elements 34 intended to resiliently engage edge 22 of the vehicle body rabbit flange 20 over a wide range of positions. Retention elements 34 include a suction cup-shaped base portion 36 and an outwardly extending stem 38 generally perpendicular to base portion 36. The free end of stem 38 includes a downardly and outwardly extending abutment portion 40 which faces edge 22 of flange 20 and extends downwardly towards the window pane 46. Surface 40 culminates in a plurality of teeth 42 facing outwardly from aperture 24 which teeth extend along stem 38 from abutment portion 40 to base 36.

Modular window assembly 32 includes pane 46, normally made of glass, which includes a molding portion 48 secured to a periphery thereof. While molding 48 facilitates the retention of the adhesive or sealant 30 applied around body rabbet flange 20 during assembly of the window panel to the motor vehicle, such molding can be eliminated by extending the sides of the pane 46 to more closely conform to the opening defined by rabbet flange 20. In addition, the molding 48 can take other forms such as the insertable molding element shown in U.S. Pat. No. 4,165,119.

Figure 4:
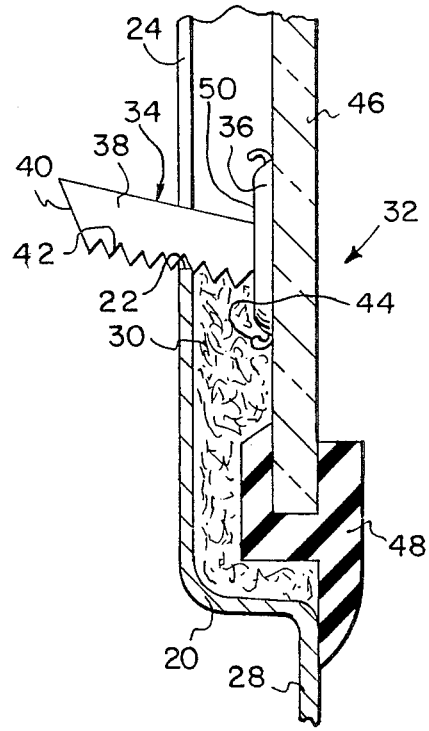
FIG. 4 is a side sectional view of the window assembly shown in the final assembled position within the window aperture.

Referring now to FIG. 4, there is a shown retention element 34 of the present invention with stem 38 deflected inwardly of aperture 24 with respect to base 36. This inward deflection is the result of forming at least the outer surface 50 of base 36 from a resilient material with the stem 38 fixedly attached at a joint therebetween or integrally formed thereon during molding.

Figure 5:
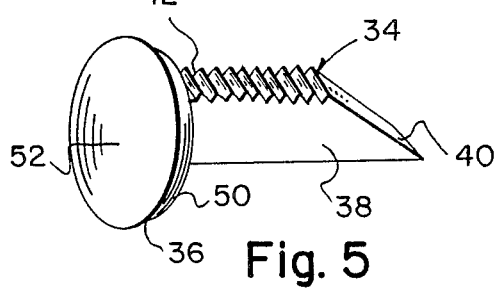
FIG. 5 is an isometric view of the window retention element of the present invention.

As can be seen in FIG. 5, prior to assembly to glass pane 46, base 36 of retention element 34 is in the form of a suction cup having a concave inner surface 52. In the preferred embodiment, the base 36 is made up of a resiliently deformable material such as molded rubber, which is capable of resiliently deforming to a flattened position upon attachment to the surface of the window pane. The material of at least outer surface 50 of base 36 of retention element 34 is such that even with a rigid stem 38 fixedly attached thereto, being deflected with respect to the perpendicular, it will deform outer surface 50, but will not cause a permanent yielding of the material of outer surface 50. The resiliency of outer surface 50 causes forces to be generated which tend to return stem 38 to the perpendicular position even after being deflected inwardly during insertion of the window panel. These forces are sufficient to retain window assembly 32 within aperture 26 of body flange 20.

Referring again to FIGS. 4 and 5, the installation of the window retention assembly with retention element 34 thereon is illustrated for a typical automotive window application. Retention element 34 is illustrated as being fixed to glass pane 46 of modular window assembly 32. This may be accomplished by placing an adhesive or sealant 44 similar to the adhesive 30, on the inner concave surface 52 of the suction cup shaped base portion 36 of retention element 34, and by applying a plurality of retention elements 34 at predetermined locations around the periphery of window assembly 32. Initially, the base 36 is retained on pane 46 by the suction generated by the deformation and flattening of cup-shaped base 36 and then retained permanently by the curing of adhesive 44 which, upon the flattening of concave surface 52, forms a bead around base 36.

After retention elements 34 have been secured to glass pane 46, window assembly 32 is positioned to be inserted into the depression in rabbet flange 20 of the motor vehicle body. The predetermined locations of elements 34 are such that the inner peripheral surface or edge 22 which surrounds aperture 24 engages tapered abutment portion 40 of the free end of stem 38 and deflects stem 38 inwardly by resiliently deforming base portion 36 at the joint therebetween. Upon sufficient insertion, deflection of stem 38 of each retention element 34 allows the teeth or locking elements 42 to engage the periphery 22 of rabbet flange 20.

It should be noted that stem 38 may be sufficiently flexible to be elongated in the axial direction. This allows stem 38 to be elongated by grasping the end of stem 30 adjacent abutment surface 40 from the interior of the vehicle and manually placed in engagement with edge 22, should the aperture 24 be misaligned with respect to the placement of element 34 on window assembly 32.

Due to the plurality of teeth 42 and resiliency of stem 38, a plurality of possible contact planes between edge 22 of flange 20 and stem 38 is provided. This ensures the resilient engagement with the vehicle body over a wide range of positions. When the fully inserted window is locked in position by retention elements 34, modular window assembly 32 is fixed in location with respect to flange 20 of the motor vehicle body and an adhesive 30 can be introduced and allowed to cure and harden as the vehicle moves along the assembly line.

Adhesive or sealant 30 can be applied and allowed to harden as the vehicle moves along the assembly line without concern for the distortion of modular window assembly 32 with respect to the vehicle body. Retention element 34 centrally positions and fixes the window assembly 32 in position for a wide variety of assembly techniques. For instance, the adhesive 30 can be applied to the rabbet flange 20 of the motor vehicle prior to the insertion of modular window assembly 32, as is shown in FIG. 3 or after the insertion.

It should be understood that the retention element 34 may be assembled into a motor vehicle body having a smaller aperture 24, which results in engagement of edge 22 with stem 36 of retention element 34 deflected at a more acute inward angle than is shown in the drawings. As stated above, the outer surface 36 of retention element 34 permits the deflection of stem 38 over a wide range of angles without yielding or breaking at the joint between stem 38 with outer surface 50 of base 36.

In some applications, it may be possible to utilize the retention elements in such a manner (by their placement and number) to effect bending of the glass to which they are attached. This would allow inexpensive flat glass panels to be used in applications normally requiring curved glass panels.

While the foregoing description is illustrative of the present invention, various modifications and embodiments have been suggested and others will be readily available to those skilled in the art. Accordingly, it is intended that the present invention be limited only by the scope of the appended claims.

What is claimed is:

1. A retention system for an automotive window of the type having a window assembly insertable onto a peripheral flange of a flanged window aperture formed in an automotive vehicle body, said window assembly to be adhesively secured thereto, the window assembly being positioned with respect to the aperture by a plurality of retention elements mounted on the window assembly and operatively disposed between the window assembly and the aperture, said retention system comprising:

a suction cup-shaped base portion having an inner side adapted to be fixedly secured to an inner peripheral surface of the window assembly and having a resilient outer side;

a generally perpendicular outward extending stem attached at a joint formed between a first end of said stem and said resilient outer side of said cup-shaped base portion, said stem having a free end deflecting toward the interior of the flanged window aperture upon engagement therewith about said joint formed between said first end thereof by outwardly deforming said resilient outer side of said cup-shaped base portion in a direction toward the interior of the window aperture;

means integral with said generally perpendicular outwardy extending stem for lockingly engaging the peripheral flange of the flanged window aperture; and curable adhesive means for application to said suction shaped base portion, prior to the placement thereof on said window assembly, said adhesive means allowing movement of said base portion with respect to said window assembly prior to curing, and fixing said base portion with respect to said window assembly after curing.

2. The automotive window retention system as set forth in claim 1 wherein said stem includes a tapered abutment portion on the free end thereof adapted to engage the peripheral flange of the flanged window aperture, and, upon engagement therewith during the insertion of the window assembly into the flanged window aperture, causing the deflection of said stem toward the interior of the window aperture.

3. The automotive window retention system as set forth in claim 1 wherein said means integral with said outwarldy extending stem for lockingly engaging the peripheral flange includes locking teeth formed on a surface of said stem, said locking teeth extending in a direction outwardly of said flanged window aperture and extending from said first end to said second end of said stem.

4. The automotive window retention system as set forth in claim 1, wherein the outer resilient side of said cup-shaped base portion of said retention element is convex.

5. The automotive window retention system as set forth in claim 1, wherein the inner side of said cup-shaped base portion of said retention element is concave prior to being mounted to the window assembly.

6. The automotive window retention system as set forth in claim 1 wherein said outwardly extending stem is made of a resiliently deformable material.

7. The automotive window retention system as set forth in claim 1 wherein said suction cup-shaped base portion is initially fixedly secured to said inner peripheral surface of the window assembly by suction generated by deforming said inner side of said base portion against said inner peripheral surface of said window assembly and permanently fixedly secured thereto by an adhesive.

* * * * *